US008594207B2

(12) United States Patent
Xiao et al.

(10) Patent No.: US 8,594,207 B2
(45) Date of Patent: *Nov. 26, 2013

(54) METHOD AND APPARATUS FOR PROVIDING CHANNEL QUALITY FEEDBACK IN AN ORTHOGONAL FREQUENCY DIVISION MULTIPLEXING COMMUNICATION SYSTEM

(75) Inventors: Weimin Xiao, Hoffman Estates, IL (US); Amitabha Ghosh, Buffalo Grove, IL (US); Rapeepat Ratasuk, Hoffman Estates, IL (US)

(73) Assignee: Motorola Mobility LLC, Libertyville, IL (US)

( * ) Notice: Subject to any disclaimer, the term of this patent is extended or adjusted under 35 U.S.C. 154(b) by 442 days.

This patent is subject to a terminal disclaimer.

(21) Appl. No.: 12/247,318

(22) Filed: Oct. 8, 2008

(65) Prior Publication Data
US 2009/0028260 A1    Jan. 29, 2009

Related U.S. Application Data

(63) Continuation-in-part of application No. 11/552,716, filed on Oct. 25, 2006, now Pat. No. 8,054,894.

(60) Provisional application No. 60/731,976, filed on Oct. 31, 2005, provisional application No. 61/017,008, filed on Dec. 27, 2007.

(51) Int. Cl.
*H04K 1/10* (2006.01)
*H04L 27/28* (2006.01)

(52) U.S. Cl.
USPC ........... 375/260; 375/262; 375/265; 375/267; 375/233; 375/340

(58) Field of Classification Search
USPC ......... 375/260, 267, 221, 265, 262, 333, 340, 375/341
See application file for complete search history.

(56) References Cited

U.S. PATENT DOCUMENTS 6,043,771 A    3/2000   Clark et al.
6,091,777 A    7/2000   Guetz et al.
(Continued)

FOREIGN PATENT DOCUMENTS

EP    1533966 A2    5/2005
EP    1890413 A     2/2008
(Continued)

OTHER PUBLICATIONS

Kolding, T.E. et al.: "Low-Bandwidth Channel Quality Indication ofr OFDMA Frequency Domain Packet Scheduling", Wireless Communication Systems, 2006., ISWCS '06. 3rd International Symposium on Wireless Communication Systems, Sep. 6-8, 2006, pp. 282-286.

(Continued)

*Primary Examiner* — Qutbuddin Ghulamali (57) ABSTRACT

In an Orthogonal Frequency Division Multiplexing communication system, wherein frequency bandwidth may be represented by multiple Resource Block Group (RBG) levels, wherein each RBG level comprises a division of the frequency bandwidth into a number of RBGs different from the number of RBGs of the other RBG levels, a user equipment measures a channel quality associated with one or more RBGs of one or more RBG levels of the multiple RBG levels, selects an RBG of from among the measured RBGs based on the measured channel qualities, and reports channel quality information associated with the selected RBG to a radio access network, wherein reporting comprises providing an index to the selected RBG and providing channel quality information for the indexed RBG.

20 Claims, 4 Drawing Sheets

(56) References Cited

U.S. PATENT DOCUMENTS

| | | |
|---|---|---|
| 6,215,827 B1 | 4/2001 | Balachandran et al. |
| 6,317,409 B1 | 11/2001 | Murakami |
| 7,640,373 B2 | 12/2009 | Cudak et al. |
| 2004/0248618 A1 | 12/2004 | Yoshii et al. |
| 2004/0264507 A1 | 12/2004 | Cho et al. |
| 2005/0025039 A1 | 2/2005 | Hwang et al. |
| 2005/0128993 A1 | 6/2005 | Yu et al. |
| 2005/0201474 A1 | 9/2005 | Cho et al. |
| 2005/0238108 A1 | 10/2005 | Suh et al. |
| 2005/0287978 A1 | 12/2005 | Maltsev et al. |
| 2006/0146760 A1* | 7/2006 | Khandekar et al. ........... 370/335 |
| 2006/0193373 A1 | 8/2006 | Agee et al. |
| 2006/0203845 A1 | 9/2006 | Monogioudis |
| 2007/0098097 A1 | 5/2007 | Khan et al. |
| 2007/0098098 A1 | 5/2007 | Xiao et al. |
| 2007/0217540 A1* | 9/2007 | Onggosanusi et al. ....... 375/267 |
| 2007/0223611 A1 | 9/2007 | Ode et al. |
| 2007/0242770 A1 | 10/2007 | Kim et al. |
| 2007/0253473 A1 | 11/2007 | Ishii et al. |
| 2008/0013610 A1* | 1/2008 | Varadarajan et al. ......... 375/221 |
| 2008/0219370 A1 | 9/2008 | Onggosanusi et al. |
| 2008/0232492 A1 | 9/2008 | Xiao et al. |
| 2010/0144282 A1 | 6/2010 | Laroia et al. |
| 2012/0051413 A1 | 3/2012 | Xiao et al. |

FOREIGN PATENT DOCUMENTS

| | | |
|---|---|---|
| JP | 2003-169036 A | 6/2003 |
| WO | 2004066104 A2 | 8/2004 |
| WO | 2004084420 A | 9/2004 |
| WO | 2006007299 A1 | 1/2006 |
| WO | 2006020741 A | 2/2006 |
| WO | 2006055241 A | 5/2006 |
| WO | 2006093468 A | 9/2006 |
| WO | 2006107835 A | 10/2006 |
| WO | 2007027825 A2 | 3/2007 |
| WO | 2007053403 A2 | 5/2007 |

OTHER PUBLICATIONS

Pedersen, K.I. et al.: "Frequency Domain Scheduling for OFDMA with Limited and Noisy Channel Feedback", Vehicular Technology Conference, 2007. VTC-2007 Fall, 2007 IEEE 66th Vehicular Technology Conference, Sep. 30-Oct. 3, 2007, pp. 1792-1796.

Supplementary European Search Report, European Patent Office, Munich, Sep. 5, 2012, all pages.

United States Patent and Trademark Office, "Non-Final Rejection" for U.S. Appl. No. 13/290,447 dated Apr. 27, 2012, 8 pages.

Motorola: "Frequency Domain Scheduling for E-Utra", 3rd Generation Partnership Project (3GPP), Technical Specification Group (TSG) Radio Access Network (RAN), Working Group 1 (WG1), XX, XX, No. R1-060381, Feb. 13, 2006, pp. 1-9.

Tarkesh Pande et al.: "On Some Techniques for Reducing the Feedback Requirement in Precoded MIMO-OFDM", Proceedings of IEEE Global Telecommunications Conference, San Francisco, CA, USA, Nov. 27, 2006, pp. 1-5.

Yakun Sun et al.: "Multi-User Scheduling for OFDM Downlink with Limited Feedback for Evolved UTRA", Vehicular Technology Conference, 2006, VTC-2006 Fall, 2006, IEEE 64th, IEEE, PI, Sep. 1, 2006, pp. 1-5.

Patent Cooperation Treaty, International Search Report and Written Opinion of the International Searching Authority for International Application No. PCT/US2008/056946, Jun. 8, 2008, 15 pages.

Communication pursuant to Article 94(3) EPC, EPC Application No. 08743877.6, Apr. 6, 2010.

* cited by examiner

METHOD AND APPARATUS FOR PROVIDING CHANNEL QUALITY FEEDBACK IN AN ORTHOGONAL FREQUENCY DIVISION MULTIPLEXING COMMUNICATION SYSTEM

CROSS-REFERENCE TO RELATED APPLICATIONS

This application is a continuation-in-part of U.S. patent application Ser. No. 11/552,716 entitled "METHOD AND APPARATUS FOR PROVIDING CHANNEL QUALITY FEEDBACK IN AN ORTHOGONAL FREQUENCY DIVISION MULTIPLEXING COMMUNICATION SYSTEM," and filed Oct. 25, 2006, and claims priority from such application and further from U.S. provisional application Ser. No. 60/731,976, entitled "METHOD AND APPARATUS FOR PROVIDING CHANNEL QUALITY FEEDBACK IN AN ORTHOGONAL FREQUENCY DIVISION MULTIPLEXING COMMUNICATION SYSTEM," and filed Oct. 31, 2005, and U.S. provisional application Ser. No. 61/017,008, entitled "METHOD AND APPARATUS FOR PROVIDING CHANNEL QUALITY FEEDBACK IN AN ORTHOGONAL FREQUENCY DIVISION MULTIPLEXING COMMUNICATION SYSTEM," and filed Dec. 27, 2007, which applications are commonly owned and incorporated herein by reference in their entirety.

FIELD OF THE INVENTION

The present invention relates generally to Orthogonal Frequency Division Multiplexing (OFDM) communication systems, and, in particular, to an exchange of channel quality information in an OFDM communication system.

BACKGROUND OF THE INVENTION

Orthogonal Frequency Division Multiple Access (OFDMA) modulation schemes have been proposed for downlink transmissions over an air interface in next generation communication systems such as 3GPP (Third Generation Partnership Project) E-UTRA (Evolved UMTS Terrestrial Radio Access) and 3GPP2 Phase 2 communication systems. In an OFDMA communication system, a frequency channel, or bandwidth, is split into multiple contiguous Resource Blocks (RBs). A grouping of multiple RBs is known as a Resource Block Group (RBG). Each RB comprises multiple, for example, 12, contiguous frequency sub-carriers that are orthogonal to each other. Under the 3GPP E-UTRA standards, a Node B then assigns the RBs to users' equipment (UEs) on a sub-frame basis, wherein a sub-frame may have a duration of one millisecond (ms).

In order to maximize bandwidth usage, OFDMA communication systems may engage in frequency selective scheduling (FSS), wherein transmission errors are minimized by scheduling a user equipment (UE) for an RB only where the UE is known to have a good downlink channel. Accordingly, FSS requires narrowband channel feedback from the UE, wherein the channel quality reported is specific to each RB. That is, for any given Transmission Time Interval (TTI), the RBs are allocated to users based on measured channel conditions. The channel condition measurements are performed by a user equipment (UE), which UE measures channel conditions for each and every RB during a measuring period, such as a Transmission Time Interval (TTI) (also known as a sub-frame) or a radio frame transmission period. The UE then reports the measured channel conditions for the RBs to a serving Node B in a Channel Quality Information (CQI) message. Based on the reported CQIs, an OFDMA communication system is able to selectively schedule the RBs over a scheduling period, typically one or more TTIs or radio frames, and further adaptively determine appropriate modulation and coding schemes for each RB during the scheduling period. However, reporting a CQI for each and every RB may consume a significant amount of uplink system overhead, especially for OFDMA systems utilizing a 20 megahertz (MHz) bandwidth and employing as many as 100 RBs within that bandwidth.

Therefore, a need exists for a method and apparatus that provides channel quality information sufficient to adaptively assign RBs to UEs over a scheduling period and that does not consuming the overhead resulting from the reporting of CQI for every RB of the frequency bandwidth.

DETAILED DESCRIPTION OF THE INVENTION

To address the need for a method and an apparatus that provides channel quality information that is sufficient to adaptively assign Resource Blocks (RBs) to users' equipment (UEs) over a scheduling period and that does not consuming the overhead resulting from the reporting of CQI for every Resource Block (RB) of the frequency bandwidth, an Orthogonal Frequency Division Multiplexing (OFDM) communication is provided wherein frequency bandwidth may be represented by multiple Resource Block Group (RBG) levels, wherein each RBG level comprises a division of the frequency bandwidth into a number of Resource Block Groups (RBGs) different from the number of RBGs of the other RBG levels, a user equipment measures a channel quality associated with one or more RBGs of one or more RBG levels of the multiple RBG levels, selects an RBG of from among the measured RBGs based on the measured channel qualities, and reports channel quality information associated with the selected RBG to a radio access network, wherein reporting comprises providing an index to the selected RBG and providing channel quality information for the indexed RBG.

Generally, an embodiment of the present invention encompasses a method for providing channel quality feedback in an OFDM communication system, wherein a frequency bandwidth may be represented by multiple RBG levels, wherein each RBG level comprises a division of the frequency bandwidth into a number of RBGs different from the number of RBGs of the other RBG levels. The method includes measuring a channel quality associated with one or more RBGs of one or more RBG levels of the multiple RBG levels, selecting an RBG from among the measured RBGs based on the measured channel qualities, and reporting channel quality information associated with the selected RBG to a radio access network, wherein reporting comprises providing an index to the selected RBG and providing channel quality information for the indexed RBG.

Yet another embodiment of the present invention encompasses user equipment that is configured to report a channel quality in an OFDM communication system, wherein a frequency bandwidth may be represented by multiple RBG levels, wherein each RBG level comprises a division of the frequency bandwidth into a number of RBGs different from the number of RBGs of the other RBG levels, and wherein the user equipment comprises a processor that is configured to measure a channel quality associated with one or more RBGs of one or more RBG levels of the multiple RBG levels, select an RBG from among the measured RBGs based on the measured channel qualities, and report channel quality information associated with the selected RBG to a radio access network, wherein reporting comprises providing an index to the selected RBG and providing channel quality information for the indexed RBG.

Figure 1:
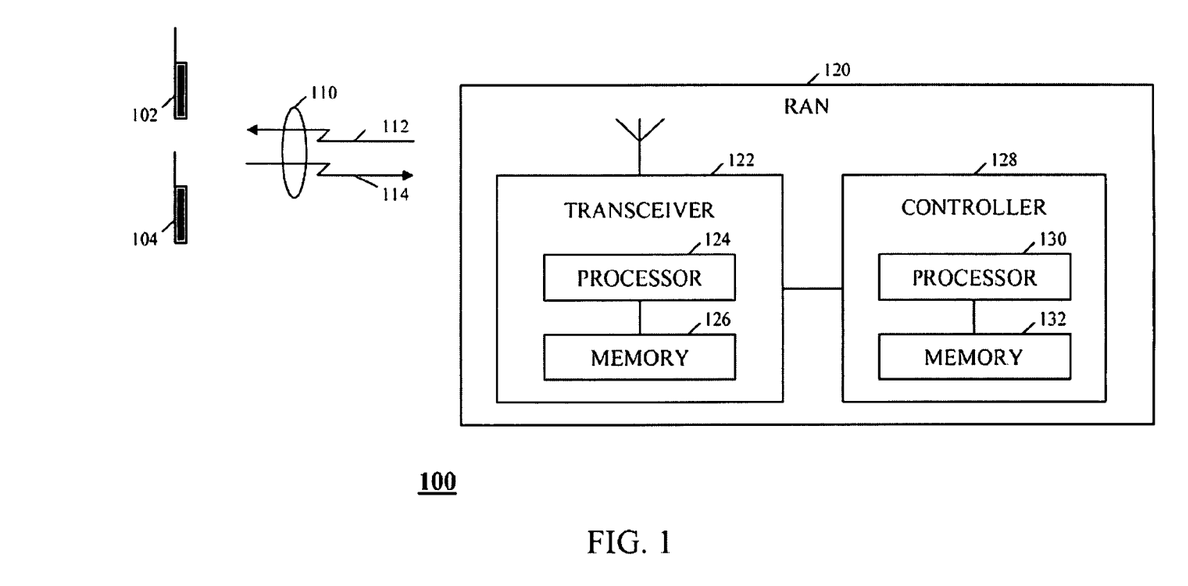
FIG. 1 is a block diagram of a wireless communication system in accordance with an embodiment of the present invention.

The present invention may be more fully described with reference to FIGS. 1-6. FIG. 1 is a block diagram of a wireless communication system 100 in accordance with an embodiment of the present invention. Communication system 100 includes multiple users' equipment (UEs) 102, 104 (two shown), such as but not limited to a cellular telephone, a radio telephone, a personal digital assistant (PDA) with radio frequency (RF) capabilities, or a wireless modem that provides RF access to digital terminal equipment (DTE) such as a laptop computer. Communication system 100 further includes a Radio Access Network (RAN) 120 that provides communication services to each of UEs 102 and 104 via an air interface 110. RAN 120 includes a transceiver 122, such as a Node B or a Base Transceiver Station (BTS), in wireless communication with each of the multiple UEs 102, 104 and further includes an access network controller 128, such as a Radio Network Controller (RNC) or a Base Station Controller (BSC), coupled to the transceiver. Air interface 110 comprises a downlink 112 and an uplink 114. Each of downlink 112 and uplink 114 comprises multiple physical communication channels, including at least one signaling channel and at least one traffic channel.

Transceiver 122 and controller 128 each includes a respective processor 124, 130, such as one or more microprocessors, microcontrollers, digital signal processors (DSPs), combinations thereof or such other devices known to those having ordinary skill in the art. The particular operations/functions of processors 124 and 130, and respectively thus of transceiver 122 and controller 128, are determined by an execution of software instructions and routines that are stored in a respective at least one memory device 126, 132 associated with the processor, such as random access memory (RAM), dynamic random access memory (DRAM), and/or read only memory (ROM) or equivalents thereof, that store data and programs that may be executed by the corresponding processor.

Figure 2:
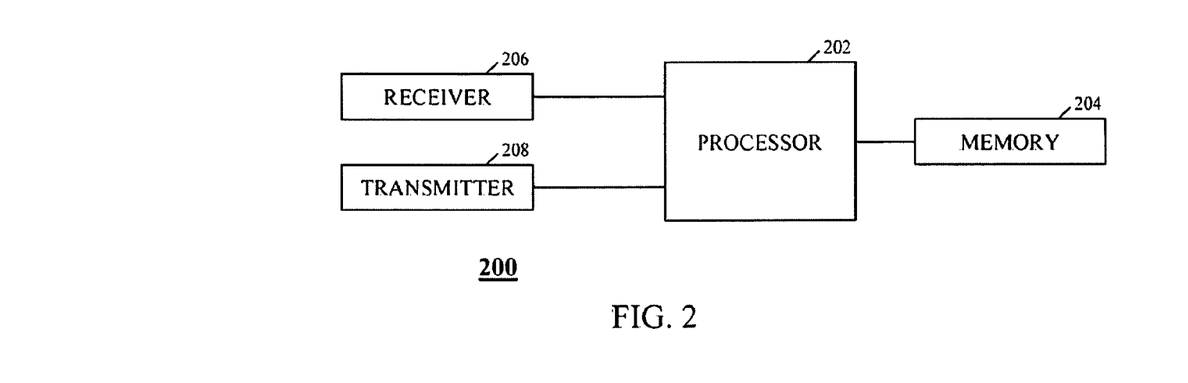
FIG. 2 is a block diagram of a user equipment in accordance with an embodiment of the present invention.

FIG. 2 is a block diagram of a user equipment (UE) 200, such as UEs 102 and 104, in accordance with an embodiment of the present invention. UE 200 includes a processor 202, such as one or more microprocessors, microcontrollers, digital signal processors (DSPs), combinations thereof or such other devices known to those having ordinary skill in the art. The particular operations/functions of processor 202, and respectively thus of UE 200, is determined by an execution of software instructions and routines that are stored in a respective at least one memory device 204 associated with the processor, such as random access memory (RAM), dynamic random access memory (DRAM), and/or read only memory (ROM) or equivalents thereof, that store data and programs that may be executed by the corresponding processor. UE 200 further includes a receiver 206 and a transmitter 208 that are coupled to processor 202 and, respectively, are configured to receive signals from, and transmit signals to, RAN 120 via air interface 110.

The embodiments of the present invention preferably are implemented within UEs 102 and 104, transceiver 122, and controller 128, and more particularly with or in software programs and instructions stored in the respective at least one memory device 204, 126, 132 and executed by respective processors 202, 124, 130. However, one of ordinary skill in the art realizes that the embodiments of the present invention alternatively may be implemented in hardware, for example, integrated circuits (ICs), application specific integrated circuits (ASICs), and the like, such as ASICs implemented in one or more of UEs 102 and 104, transceiver 122, and controller 128. Based on the present disclosure, one skilled in the art will be readily capable of producing and implementing such software and/or hardware without undo experimentation.

Communication system 100 comprises a wideband packet data communication system that employs an Orthogonal Frequency Division Multiplexing (OFDM) modulation scheme for transmitting data over air interface 110. Preferably, communication system 100 is an Orthogonal Frequency Division Multiple Access (OFDMA) communication system, wherein a frequency bandwidth is split into multiple Resource Blocks (RBs) during a given time period, such as over 12 OFDM symbols in a 3GPP E-UTRA communication system. Each Resource Block (RB) comprises multiple orthogonal frequency sub-carriers over a given number of OFDM symbols, that are the physical layer channels over which traffic and signaling channels are transmitted in a TDM or TDM/FDM fashion. For example, in a 3GPP E-UTRA communication system, each RB includes 12 sub-carriers. The channel bandwidth may be sub-divided into one or more Resource Block Groups (RBGs), or sub-bands, wherein each Resource Block Group (RBG) comprises one or more RBs that may or may not be contiguous and the RBGs may or may not be of equal size. A user may be assigned one or more RBGs for an exchange of bearer information, thereby permitting multiple users to transmit simultaneously on the different RBs such that each user's transmission is orthogonal to the other users' transmissions.

In addition, communication system 100 preferably operates in accordance with the 3GPP (Third Generation Partnership Project) E-UTRA (Evolutionary UMTS Terrestrial Radio Access) standards, which standards specify wireless telecommunications system operating protocols, including radio system parameters and call processing procedures. However, those who are of ordinary skill in the art realize that communication system 100 may operate in accordance with any wireless telecommunication system employing an Orthogonal Frequency Division Multiplexing (OFDM) modulation scheme, such as a 3GPP2 (Third Generation Partnership Project 2) Evolution communication system, for example, a CDMA (Code Division Multiple Access) 2000 1XEV-DV communication system, a Wireless Local Area Network (WLAN) communication system as described by the IEEE (Institute of Electrical and Electronics Engineers)

802.xx standards, for example, the 802.11a/HiperLAN2, 802.11g, or 802.16 standards, or any of multiple proposed ultrawideband (UWB) communication systems.

In order to selectively schedule the multiple UEs 102, 104 for use of one or more RBGs, or sub-bands, of a frequency bandwidth employed by communication system 100, RAN 120 provides each UE 102, 104 with scheduling information for a scheduling period. The scheduling information typically includes a reference start time, preferably in units of radio frames such as a starting Cell System Frame Number (SFN) index or a starting Connection Frame Number (CFN) index, a scheduling duration, that is, a duration of a time period during which the provided scheduling information is applicable, for example, in units of radio frames or Transmission Time Intervals (TTIs), and an allocated RBG.

Figure 3:
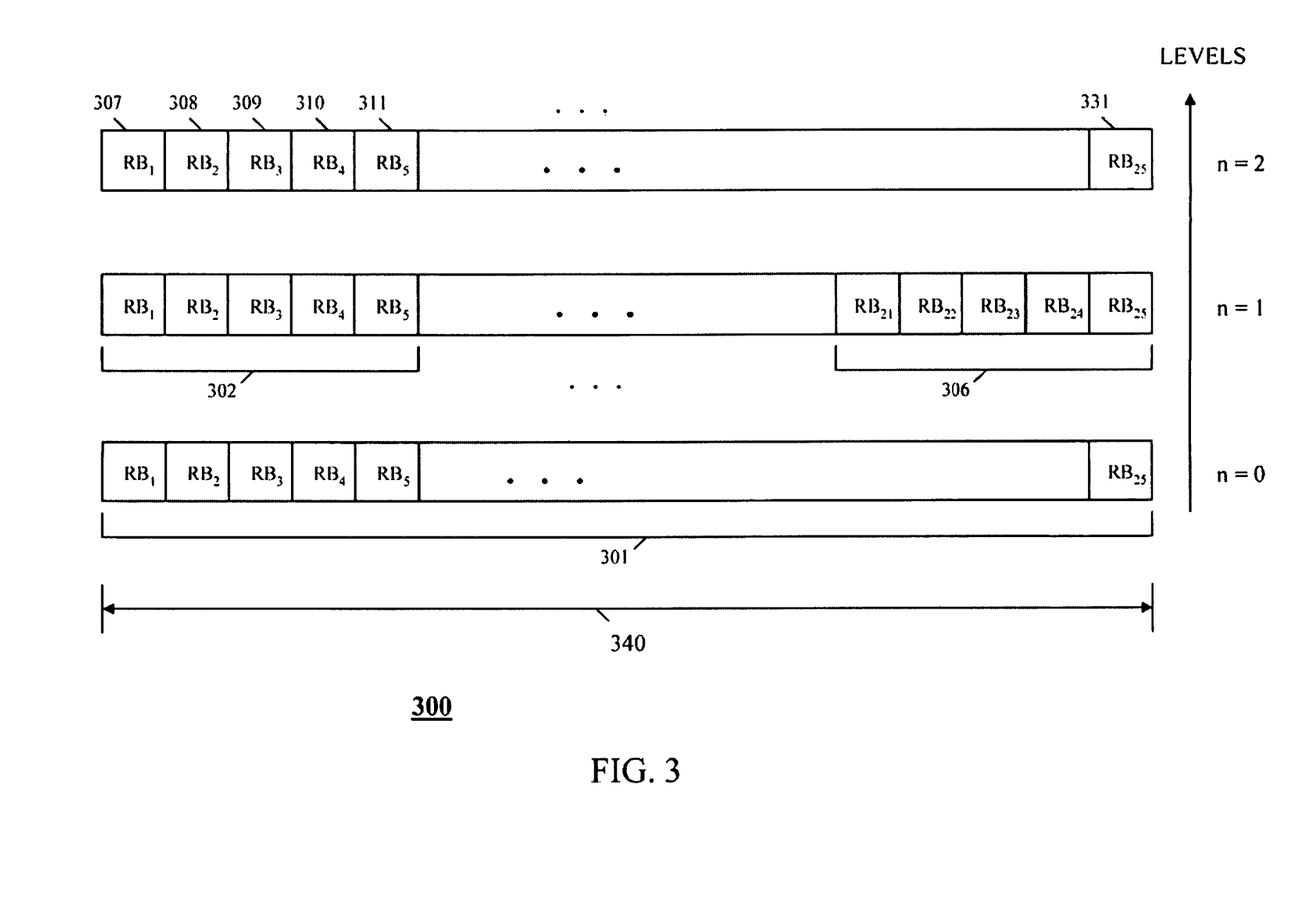
FIG. 3 is a block diagram of an exemplary scheme employed by the communication system of FIG. 1 in dividing a frequency bandwidth into one or more Resource Block Groups in accordance with an embodiment of the present invention.

When selectively scheduling the multiple UEs 102, 104 to use the frequency bandwidth during a scheduling period, communication system 100 may divide the frequency bandwidth into one or more RBGs at each level of multiple levels. It may be noted that the number of carriers in each RBG may vary from level to level. For example, FIG. 3 is a block diagram 300 of an exemplary RBG division scheme employed by communication system 100 in dividing a frequency bandwidth 340 into one or more RBGs in accordance with an embodiment of the present invention. As depicted in block diagram 300, frequency bandwidth 340 comprises twenty-five (25) Resource Blocks (RBs), each RB approximately 180 kilohertz (kHz) wide. Communication system 100 then may divide frequency bandwidth 340 into one, five, or twenty-five RBGs during a scheduling period. Each such division of frequency bandwidth 340 comprises a different representation of the same frequency bandwidth and may be thought of as a different level of division of the frequency bandwidth. As a result, the division of frequency bandwidth 340 into a number of RBGs may then be thought of as, and represented by, a hierarchical structure, wherein each increasing level (n) of the hierarchical structure corresponds to a dividing of the frequency bandwidth into a greater number of RBGs. For example, as depicted in block diagram 300, at a first RBG level (n=0) of the hierarchical structure, frequency bandwidth 340 is not subdivided, that is, frequency bandwidth 340 comprises only a single RBG 301. At a second RBG level (n=1) of the hierarchical structure, frequency bandwidth 340 is subdivided into five RBGs 302-306. And at a third RBG level (n=2) of the hierarchical structure, frequency bandwidth 340 is subdivided into twenty-five (25) RBGs 307-331.

In other words, with respect to the frequency bandwidth depicted in FIG. 3, for any given scheduling period, communication system 100 may divide frequency bandwidth 340 into one, five, or twenty-five (25) RBGs, or sub-bands, each of which divisions corresponds to a level (n=0, 1, or 2) of the hierarchical structure. That is, at each level of the hierarchical structure (n=0, 1, or 2), frequency bandwidth 340 is divided into '$5^n$' RBGs. A value 'N' corresponds to the value associated with the top level of the hierarchical structure, that is, at the top level, 'n=N,' (that is, N=2 in FIG. 3) and the number of different levels of RBG divisions is then equal to 'N+1' (for example, in FIG. 3, the number of different levels of RBG divisions is equal to N+1, or 3). However, one of ordinary skill in the art realizes that a number of possible RBGs per level, and a number of levels of bandwidth divisions, may vary with the frequency bandwidth employed and is further up to a designer of the system, and that the value of 'N' may vary correspondingly.

In order to selectively schedule the multiple UEs 102, 104 to use a frequency bandwidth employed by communication system 100, such as frequency bandwidth 340, a UE, such as UE 102, reports information concerning RB quality to RAN 120. In the prior art, a UE provides complete channel quality information for all of the top level RBs, such as RBs 307-331 with respect to frequency bandwidth 340, in each CQI message. However, such reporting may consume a significant amount of overhead when there are a large number of RBs. In order to conserve system capacity, communication system 100 merely requires that UE 102 provide information concerning the channel quality of a single RBG, for example, the RBG with the best channel quality, rather that providing a channel quality for all RBs, during a measuring and reporting period.

Figure 4:
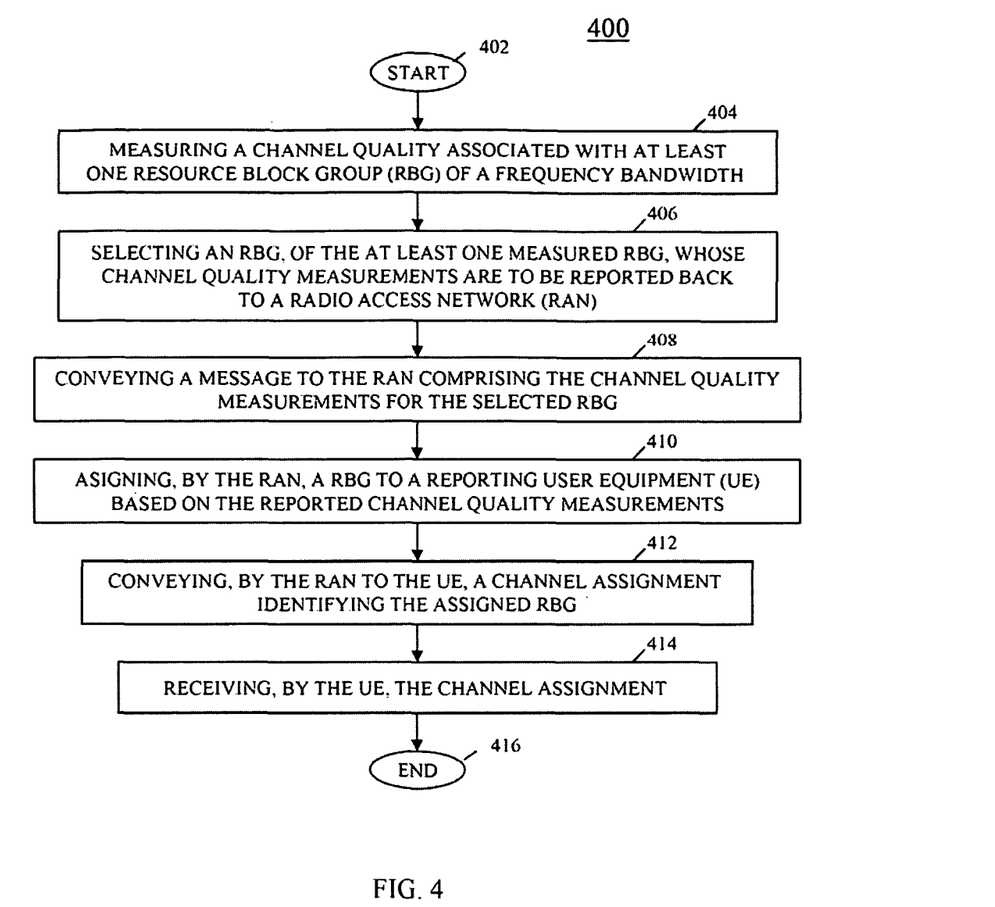
FIG. 4 a logic flow diagram of a method for a reporting of information concerning sub-band channel quality by a user equipment of FIG. 1 to a serving radio access network of FIG. 1 in accordance with an embodiment of the present invention.

Referring now to FIG. 4, a logic flow diagram 400 is provided that depicts a reporting of information concerning RB channel quality by a UE, such as UE 102, to a serving RAN, that is, RAN 120, in accordance with an embodiment of the present invention. Logic flow 400 begins (402) when UE 102 measures (404) a channel quality, preferably measuring Channel Quality Information (CQI) as is known in the art, associated with at least one RBG of a frequency bandwidth employed by communication system 100. For example, UE 102 may measure a received signal power, a signal-to-noise ratio, a carrier-to-interference ratio, or a carrier power-to-noise power ratio associated with a signal transmitted over a channel utilizing the RBG and received by the UE via receiver 206, or may measure a bit error rate or a frame error rate associated with such a signal. One of ordinary skill in the art realizes that many parameters may be measured in determining channel quality and that any such parameter may be used herein without departing from the spirit and scope of the present invention.

In one embodiment of the present invention, RAN 120 may inform UE 102 of the RBGs to be measured during a measuring time period. For example, RAN 120 may provide UE 102 with a list of frequencies to monitor during each of one or more measuring periods, or the RAN may provide the UE with an identifier, such as an index number, of each RBG to be measured during each of one or more measuring periods and, based upon the identifier, the UE is able to determine the frequencies to monitor during each measuring period.

In another embodiment of the present invention, UE 102 may be pre-programmed with information concerning which RBGs to monitor during a measuring period, which information is also stored at RAN 120, for example, in the at least one memory device 126, 132, of transceiver 122 or controller 128. For example, UE 102 may be pre-programmed to cycle through the RBGs of the frequency bandwidth during successive measuring periods. For example, and with reference to FIG. 3, UE 102 may be programmed to cycle its way through the multiple RBGs 301-331, one RBG at a time. That is, UE may measure a channel quality associated with only a first RBG, such as RBG 301, during a first measuring period. UE 102 may then measure a channel quality associated with a successive RBG during each successive measuring period, such as a channel quality associated with RBG 302 during a second measuring period and a channel quality associated with RBG 303 during a third measuring period, working its way through all of the RBGs and re-measuring a channel quality associated with the first measured RBG 301 after measuring all of the other sub-bands.

By way of another example, and again with reference to FIG. 3, UE 102 may be programmed to cycle its way through the levels (n=0, 1, 2), one level at a time. That is, UE 102 may be programmed to measure a channel quality associated with the RBGs of level '0,' that is, RBG 301, during a first measuring period. UE 102 may then measure a channel quality associated with the RBGs of a next level during each successive measuring period, such as a channel quality associated with each of the RBGs of level '1,' that is, RBGs 302-306, during a second measuring period to produce a first multiple measured channel qualities, and a channel quality associated with the RBGs of level '2,' that is, RBGs 307-331, during a third measuring period to produce a second multiple measured channel qualities. After UE 102 measures a channel quality associated with the RBGs of a top level, such as level '2' with respect to FIG. 3, UE 102 returns to measuring a channel quality associated with the RBGs of the bottom level, that is, level '0.'

In still other embodiments of the present invention, UE 102 may measure all of the RBGs during each measuring period or may measure a channel quality associated with each RBG of a given level and channel qualities associated with selected RBGs of other levels, such as an RBG of another level whose channel quality was reported in a previous channel quality message, as is described in greater detail below.

In response to measuring the channel quality associated with at least one RBG of a frequency bandwidth, UE 102 selects (406) an RBG, of the at least one measured RBG, whose channel quality information is to be reported back to RAN 120 in a channel quality message. When, at step 406, UE 102 selects an RBG from among multiple RBGs whose channel quality is measured during a measuring period, for example, from among multiple measured RBGs of a same level, UE 102 preferably compares the measured channel qualities to produce a comparison and, based on the comparison, selects an RBG associated with a best measured channel quality. However, in other embodiments of the present invention, UE 102 may, based on the comparison of measured channel qualities, report back channel quality information associated with an RBG that has a middle channel quality of the measured channel qualities or that has a worst channel quality. Multiple algorithms will occur to one of ordinary skill in the art to be used to determine which RBG, of the at least one measured RBG, whose channel quality information is to be reported back to RAN 120, and any such algorithm may be used herein without departing from the spirit and scope of the present invention.

For example, in one embodiment of the invention, UE 102 may report channel quality information for the RBGs on an RBG-by-RBG basis. That is, during each successive reporting period, UE 102 may report channel quality information associated with a successive RBG. For example, and with reference to FIG. 3, UE 102 may work its way through the RBGs 301-331, one RBG at a time. That is, UE may report a channel quality associated with a first RBG, that is, RBG 301, during a first reporting period, may report a channel quality associated with a next RBG, that is, RBG 302, during a second reporting period, and so on. After reporting a channel quality associated with a last RBG, that is, RBG 331, UE 102 returns to the first RBG, that is, RBG 301, and reports a newly measured channel quality associated with the first RBG during a next reporting period.

In another embodiment of the invention, UE 102 may report channel quality information for the RBGs on a level-by-level basis. That is, during each successive reporting period, UE 102 selects a next, preferably successive, level and reports channel quality information associated with an RBG of the selected next level. For example, and with reference to FIG. 3, UE 102 may work its way progressively through levels '0' through '2,' one level at a time. That is, UE may report a channel quality associated with an RBG of a first level, that is, level '0' and RBG 301, during a first reporting period. During a second reporting period, UE 102 may report a channel quality associated with an RBG of a next, second level, that is, level '1' and RBGs 302-306. And during a third reporting period, UE 102 may report a channel quality associated with an RBG of a next, third level, that is, level '2' and RBGs 307-331. After reporting a channel quality associated with a top level, that is, level '2,' UE 102 returns to the first level, that is, level '0' and RBG 301, and reports a newly measured channel quality associated with an RBG of the first level.

Figure 5:
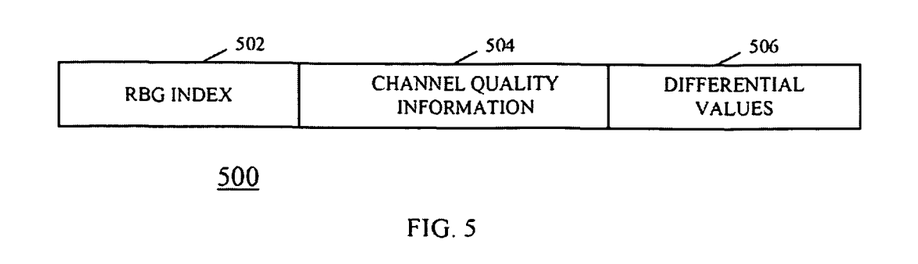
FIG. 5 is a block diagram of an exemplary channel quality message in accordance with various embodiments of the present invention.

In response to selecting an RBG whose channel quality measurements are to be reported back to RAN 120 during the reporting period, UE 102 reports the channel quality measurements of the selected RBG back to RAN 120. That is, in response to selecting an RBG, UE 102 assembles, and conveys (408) to the RAN via transmitter 208 during the reporting period, and the RAN receives from the UE, a message informing of a channel quality, preferably comprising Channel Quality Information (CQI), associated with the selected RBG. UE 102 includes in the message an index to the selected RBG along with the associated channel quality information. For example, FIG. 5 is a block diagram of an exemplary channel quality message 500 in accordance with various embodiments of the present invention. Channel quality message 500 includes a first data field 502 that comprises an index to the RBG selected at step 406, such as an index to one of RBGs 301-331. Channel quality message 500 further includes a second data field 504 that comprises channel quality information, such as channel quality measurements, associated with the selected RBG.

Figure 6:
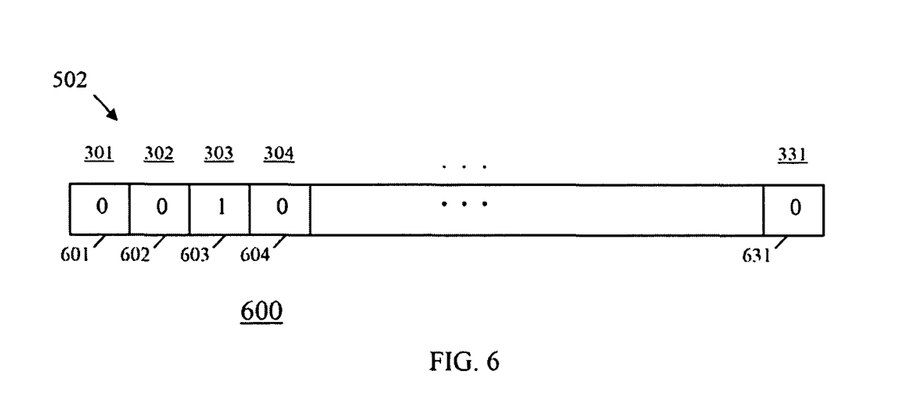
FIG. 6 is a block diagram of an exemplary bit map that may be utilized in the channel quality message of FIG. 5 in accordance with an embodiment of the present invention.

The index value reported in data field 502 may be a value associated with the reported RBG or data field 502 may index the RBGs by use of a bit map. For example, when RBGs 301-331 are indexed by data field 502, then five bits may be used in the data field to reference the RBGs. For example, the value '00000' may represent RBG 301, '00001' may represent RBG 302, '00010' may represent RBG 303, '00011' may represent RBG 304, and so on. By way of another example, when a bit map is used, data field 502 may include a bit corresponding to each RBG. For example, FIG. 6 depicts an exemplary bit map 600 that may be used in data field 502 to reference RBGs 301-331. Bit map 600 includes 31 bits 601-631, wherein each bit of the thirty-one (31) bits 601-631 corresponds to a respective RBG of the thirty-one (31) RBGs 301-331. When a bit has a value of '1' (for example, bit 603 in FIG. 6), that indicates that the channel quality information reported in data field 504 is for that bit's corresponding RBG (that is, RBG 303). Depending upon the number of RBGs, a disadvantage of using a bit map is that the number of bits required to index to all of the RBGs (31 bits in the above example) may be far greater than the bits required merely to provide a single index value to the RBGs (5 bits in the above example).

Channel quality message 500 may further include a third data field 506 that comprises an update of channel quality information associated with at least one previously reported RBG. For example, suppose that a first data field 502 and a second data field 504 of a current channel quality message comprise an identifier and a channel quality associated with an RBG of level 'n' (with respect to block diagram 300, n=0, 1, or 2). Further suppose that, in each successive channel quality message, UE is reporting back a channel quality of an RBG associated with a level 'n' that is one level higher than the level 'n−1' of the RBG reported in the preceding channel quality message (note that, when the levels are being cycled through in successive channel quality messages, after a channel quality of an RBG of level n=2 is reported in a channel quality message, the next channel quality message reports a channel quality of an RBG of level n=0). In such an instance, third data field 506 may comprise channel quality information associated with the RBG of level 'n−1' whose channel quality information was reported in the preceding channel quality message.

In order to minimize a size of the channel quality message, the channel quality information included in third data field 506 may comprise a differential value indicating a change in the channel quality of the level, or the sub-band that was selected for reporting, whose channel quality information was reported in an immediately preceding channel quality message. Thus RAN 120 knows the level and/or sub-band associated with the channel quality information reported in third data field 506 without the level or sub-band being expressly identified in the message. For example, if the channel quality information reported for a selected sub-band in a preceding channel quality message comprises a voltage associated with a measured channel quality, third data field 506 may comprise a value associated with a change in such a voltage, such a binary value corresponding to a change in decibels (dBs), resulting from a re-measuring of the sub-band's channel quality during the most recent measuring period.

In another embodiment of the present invention, the channel quality message may require only first data field 502. For example, UE 102, in response to measuring a channel quality of one or more RBGs, determines a threshold channel quality. The threshold channel quality may be a predetermined value that is maintained in the at least one memory device 204 of the UE or the UE may determine a channel quality threshold based on the measured channel qualities. For example, a threshold value may be a value that is 'X' dB below the highest measured signal strength or the threshold value may be a value that is exceeded by only a given percent of the channel quality measurements or measured RBGs. UE 102 then indicates in the bit map 600, which bit map is included in first data field 502, the RBGs whose measured channel quality exceeds the channel quality threshold. That is, UE 102 may embed a '1' in each data field of the bit map that corresponds to an RBG whose channel quality exceeds the channel quality threshold, and the UE may embed a '0' in each data field of the bit map that corresponds to an RBG whose channel quality is not measured or is below the channel quality threshold. By merely conveying the bit map, UE is able to indicate the RBGs that are preferable and/or acceptable to the UE and the RBGs that are not. However, in yet another embodiment of the present invention, the UE may include, in a second data field 504, a channel quality associated with the reported RBGs whose measured channel quality exceeds the channel quality threshold, such as the channel quality threshold that was used, an average channel quality for the RBGs, or a channel quality of the highest, middle, or lowest of the RBGs. The RAN 120 then may assume the reported channel quality for the RBGs whose measured channel quality is indicated to exceed the channel quality threshold.

In still another embodiment of the present invention, wherein the channel quality message may require only first data field 502, the bit map merely may include a data field for each RB. For example, with respect to bandwidth 340, the bit map may include only twenty-five (25) bits that correspond to the twenty-five (25) RBs $RB_1$-$RB_{25}$. In response to measuring a channel quality of one or more of the RBs, UE 102 may determine a channel quality threshold as described above and indicate, in the bit map included in first data field 502, the RBs whose measured channel quality exceeds the channel quality threshold. That is, UE 102 may embed a '1' in each data field of the bit map that corresponds to an RB whose channel quality exceeds the channel quality threshold, and may embed a '0' in each data field of the bit map that corresponds to an RB whose channel quality was not measured or is below the channel quality threshold. However, in yet another embodiment of the present invention, the UE may include, in a second data field 504, a channel quality associated with the reported RBs whose measured channel quality exceeds the channel quality threshold, such as the channel quality threshold that was used, an average channel quality for the RBs, or a channel quality of the highest, middle, or lowest of the RBs. The RAN 120 then may assume the reported channel quality for the RBGs whose measured channel quality is indicated to exceed the channel quality threshold. In response to receiving the bit map, RAN 120 may assemble an RBG for the UE based on the values in the bit map, for example, by including in the RBG one or more RBs associated with a '1' in the bit map. As is known in the art, the RBs included in an RBG need not be contiguous.

When the RBG being measured comprises the entire frequency bandwidth, such as RBG 301 with respect to bandwidth 340, then the channel quality information reported by the UE may comprise a channel quality value averaged over the entire bandwidth. For example, typically channel quality measurements are made for channels that are significantly narrower than the entire frequency bandwidth. When the frequency bandwidth comprises multiple RBGs that are each sufficiently narrow, a channel quality measurement may cover all or nearly all of the RBG. However, when the frequency bandwidth comprises one or more RBGs that are particularly wide, such as a single RBG, for example, RBG 301, that covers nearly the entire frequency bandwidth, then each RBG may be associated with multiple channels that are measured during a measuring period. In such an event, UE 102 may average the channel quality measurements made for the multiple channels during a measuring period to produce an average channel quality measurement and the channel quality information reported by the UE for the RBG may comprise an average channel quality value.

Based at least on the received channel quality message, for example, based on the channel quality message or based on the channel quality message and one or more preceding channel quality messages, RAN 120 assigns (410) an RBG to the reporting UE, that is, UE 102. RAN 120 then conveys (412) to UE 102, and the UE receives (414) from the RAN via receiver 206, a channel assignment identifying the assigned RBG. Logic flow 400 then ends (416).

Thus by exchanging channel quality messages that each comprises channel quality information associated with a selected RBG, such as single RBG of an RBG level, a REAN may adaptively assign RBGs to reporting UEs during a scheduling period. Further, in order to preserve bandwidth, the RAN and a reporting UE identify the RBG whose channel quality information is being provided by use of an index value associated with the RBG. In this manner, communication system 100 consumes less overhead in the provision of channel quality feedback than OFDM systems of the prior art, which prior art systems exchange CQI messages that include CQI for every RB of a frequency bandwidth. Further, the channel quality messages fed back by communication system 100 may further include updates of channel quality information provided in previous channel quality messages. As these are updates of previously provided information, such as an RBG whose channel quality information was provided in an immediately preceding channel quality message, a receiving RAN is able to determine the RBG associated with the update without the RBG being expressly identified in the message. By not expressly identifying the RBG in the message, message size may be reduced and system overhead conserved. Further, by including updates, such as differential information, rather than complete CQI, system overhead is further conserved.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus. Furthermore, unless otherwise indicated herein, the use of relational terms, if any, such as first and second, top and bottom, and the like are used solely to distinguish one entity or action from another entity or action without necessarily requiring or implying any actual such relationship or order between such entities or actions.

What is claimed is:

1. A method for providing channel quality feedback in an Orthogonal Frequency Division Multiplexing communication system, wherein a frequency bandwidth is represented by a plurality of Resource Block Group (RBG) levels, wherein each RBG level comprises a division of the frequency bandwidth into a number of Resource Block Groups (RBGs) different from the number of RBGs of the other RBG levels, and wherein the method comprises:
measuring a channel quality associated with one or more RBGs of one or more RBG levels of the plurality of RBG levels;
selecting an RBG from among the measured RBGs based on the measured channel quality, wherein selecting further comprises:
comparing the measured channel quality to a channel quality threshold to produce a comparison; and
selecting the RBG based on the comparison; and
reporting channel quality information associated with the selected RBG to a radio access network, wherein reporting comprises providing an index to the selected RBG and providing channel quality information for the indexed RBG.

2. The method of claim 1, wherein measuring comprises measuring a channel quality associated with each Resource Block Group (RBG) of a single RBG level and selected Resource Block Groups of other RBG levels.

3. The method of claim 1, wherein selecting a Resource Block Group (RBG) comprises selecting an RBG of a plurality of Resource Block Groups (RBGs) within a same RBG level that has a best associated channel quality of the channel qualities associated with the plurality of RBGs within the same RBG level.

4. The method of claim 1, wherein measuring a channel quality associated with one or more Resource Block Groups comprises selecting a Resource Block Group (RBG) level and measuring a channel quality associated with each RBG of the selected RBG level and wherein selecting comprises selecting an RBG of the selected RBG level based on the measured channel quality.

5. The method of claim 1, wherein the channel quality information message further comprises channel quality information associated with a Resource Block Group whose channel quality information was reported in a previous channel quality information message.

6. The method of claim 5, wherein the channel quality information associated with the Resource Block Group whose channel quality information was reported in a previous channel quality information message comprises a differential value.

7. The method of claim 1, wherein the index comprises a bit map associated with the plurality of Resource Block Groups.

8. The method of claim 7, wherein selecting comprises:
determining a channel quality threshold;
comparing the measured channel qualities to the channel quality threshold; and
selecting one or more Resource Block Groups (RBGs) based on the comparison of the measured channel qualities to the channel quality threshold; and
wherein reporting comprises indicating, in the bit map, the RBGs whose measured channel qualities exceed the channel quality threshold.

9. A method for providing channel quality feedback in an Orthogonal Frequency Division Multiplexing communication system, wherein a frequency bandwidth is represented by a plurality of Resource Block Group (RBG) levels, wherein each RBG level comprises a division of the frequency bandwidth into a number of Resource Block Groups (RBGs) different from the number of RBGs of the other RBG levels, and wherein the method comprises:
measuring a channel quality associated with one or more RBGs of one or more RBG levels of the plurality of RBG levels;
selecting an RBG from among the measured RBGs based on the measured channel quality, wherein selecting further comprises:
determining a channel quality threshold;
comparing the measured channel quality to the channel quality threshold; and
selecting one or more RBGs based on the comparison of the measured channel quality to the channel quality threshold; and
reporting channel quality information associated with the selected one or more RBGs to a radio access network, wherein reporting comprises providing an index to the selected RBG and providing channel quality information for the indexed RBG.

10. A method for providing channel quality feedback in an Orthogonal Frequency Division Multiplexing communication system, wherein a frequency bandwidth is divided into a plurality of Resource Blocks (RBs) and wherein the method comprises:
measuring a channel quality associated with one or more RBs of the plurality of RBs;
determining a channel quality threshold;
comparing the measured channel quality to the channel quality threshold; and
indicating, in a bit map, one or more RBs whose measured channel qualities exceed the channel quality threshold; and conveying a message to a radio access network comprising the bit map and no other channel quality measurements.

11. The method of claim 10, wherein the bit map is conveyed to the radio access network by a user equipment and wherein the method further comprises assembling, by the radio access network, a Resource Block Group for assignment to the user equipment based on the bit map.

12. A user equipment that is configured to report a channel quality in an Orthogonal Frequency Division Multiplexing communication system, wherein a frequency bandwidth is represented by a plurality of Resource Block Group (RBG) levels, wherein each RBG level comprises a division of the frequency bandwidth into a number of Resource Block Groups (RBGs) different from the number of RBGs of the other RBG levels, and wherein the user equipment comprises: a processor that is configured to measure a channel quality associated with one or more RBGs of one or more RBG levels of the plurality of RBG levels; select an RBG from among the measured RBGs based on the measured channel quality by comparing the measured channel quality to a channel quality threshold to produce a comparison; selecting an RBG based on the comparison; and report channel quality information associated with the selected RBG to a radio access network, wherein reporting comprises providing an index to the selected RBG and providing channel quality information for the indexed RBG.

13. The user equipment of claim 12, wherein the processor is configured to select a Resource Block Group by determining a channel quality threshold, comparing the measured channel qualities to the channel quality threshold, and selecting one or more Resource Block Groups (RBGs) based on the comparison of the measured channel qualities to the channel quality threshold, and wherein the processor is configured to report channel quality information by reporting channel quality information associated with the selected one or more RBGs.

14. The user equipment of claim 12, wherein the processor is configured to measure a channel quality associated with each Resource Block Group (RBG) of the plurality of Resource Block Groups (RBGs) by measuring a channel quality associated with each RBG of a single RBG level and selected RBGs of other RBG levels.

15. The user equipment of claim 12, wherein the processor is configured to select a Resource Block Group (RBG) by selecting an RBG within a same RBG level that has a best associated channel quality of the channel qualities associated with the plurality of Resource Block Groups within the same RBG level.

16. The user equipment of claim 12, wherein the processor is configured to measure a channel quality associated with one or more Resource Block Groups by selecting a Resource Block Group (RBG) level of the plurality of RBG levels and measuring a channel quality associated with each RBG of the selected RBG level and wherein selecting comprises selecting an RBG of the selected RBG level based on the measured channel qualities.

17. The user equipment of claim 12, wherein the channel quality information message further comprises channel quality information associated with a Resource Block Group whose channel quality information was reported in a previous channel quality information message.

18. The user equipment of claim 17, wherein the channel quality information associated with the Resource Block Group whose channel quality information was reported in a previous channel quality information message comprises a differential value.

19. The user equipment of claim 12, wherein the index comprises a bit map associated with the plurality of Resource Block Groups.

20. The user equipment of claim 19, wherein the processor is configured to select a Resource Block Group by determining a channel quality threshold, comparing the measured channel quality to the channel quality threshold, and selecting one or more Resource Block Groups (RBGs) based on the comparison of the measured channel quality to the channel quality threshold, and wherein the processor is configured to report channel quality information by indicating, in the bit map, the RBGs whose measured channel qualities exceed the channel quality threshold.

* * * * *